A. A. KRAMER.
VEHICLE TANK CONSTRUCTION.
APPLICATION FILED DEC. 23, 1920.
1,390,045.
Patented Sept. 6, 1921.
2 SHEETS—SHEET 1.
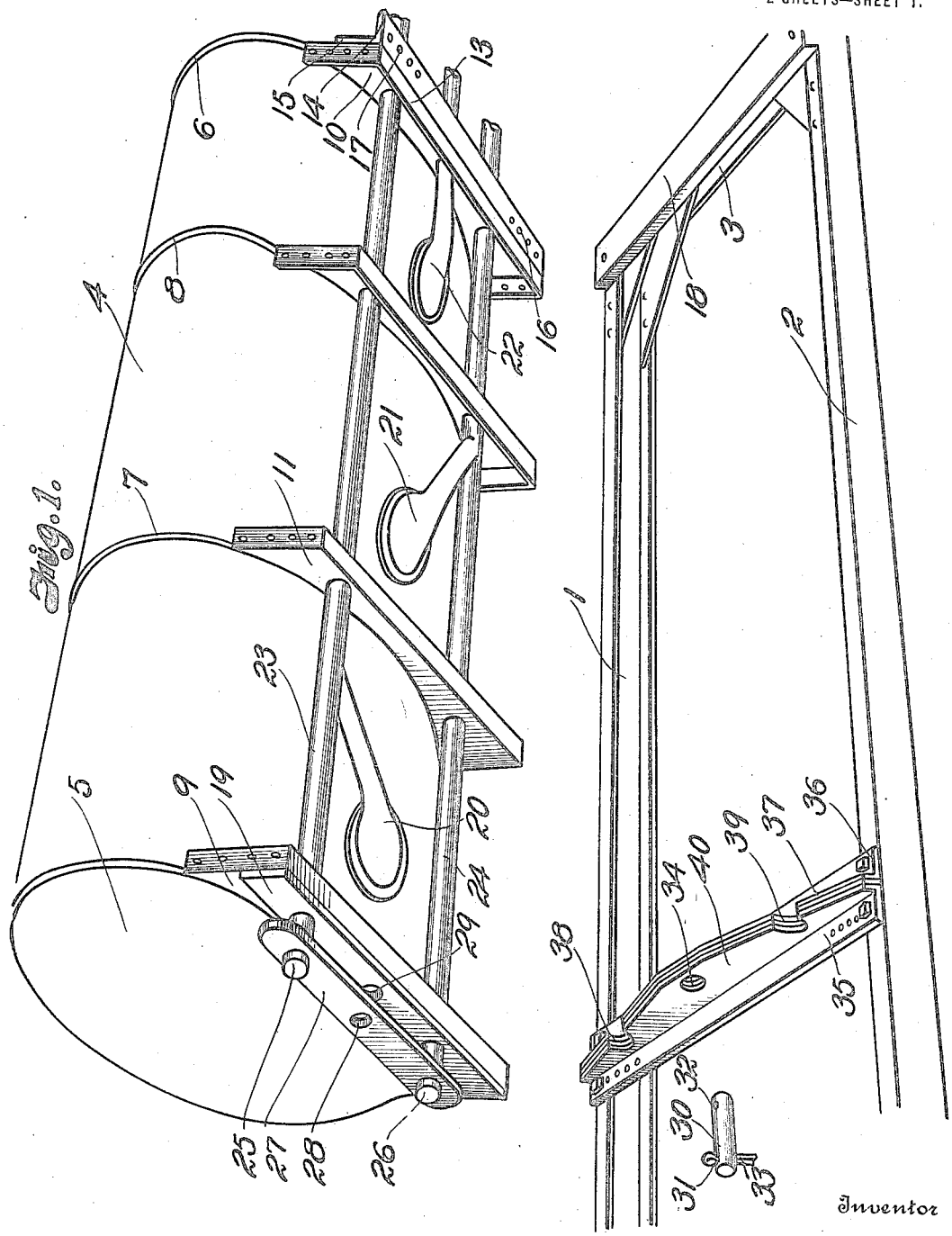
Inventor
Andrew A. Kramer.
By Arthur E. Brown
Attorney

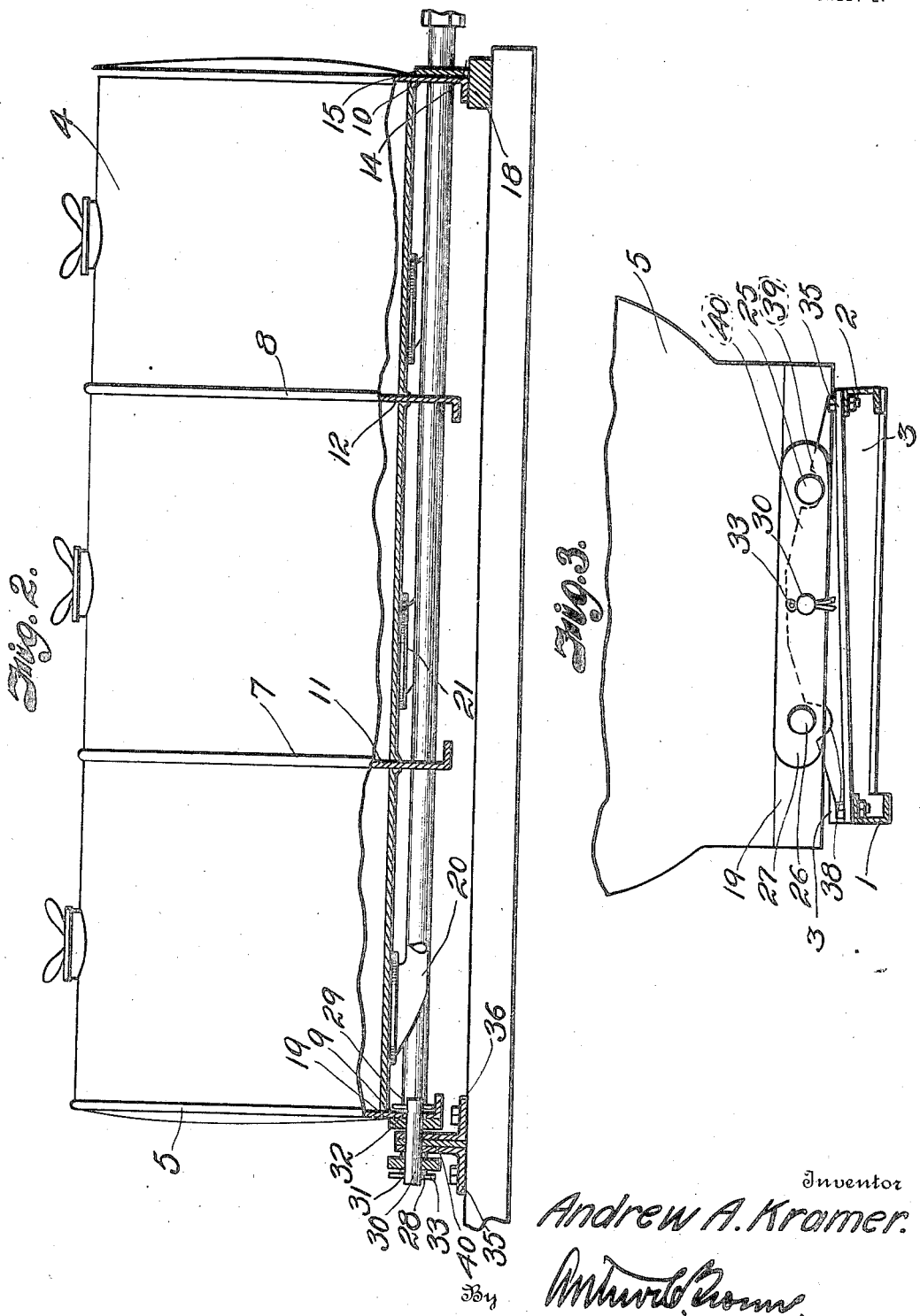

UNITED STATES PATENT OFFICE.

ANDREW A. KRAMER, OF KANSAS CITY, MISSOURI.

VEHICLE-TANK CONSTRUCTION.

1,390,045.  Specification of Letters Patent.  Patented Sept. 6, 1921.

Application filed December 23, 1920. Serial No. 432,809.

*To all whom it may concern:*

Be it known that I, ANDREW A. KRAMER, a citizen of the United States, residing at Kansas City, in the county of Jackson and State of Missouri, have invented certain new and useful Improvements in Vehicle-Tank Construction; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to tank constructions and among the objects of the invention is the provision of means for reinforcing the tank construction by a novel arrangement of dispensing pipes through which the liquid is discharged from the tank, the arrangement being such that the dispensing pipes or tubes may also be utilized for supporting bearings of a pivot for a connection between the tank and a vehicle frame or chassis.

The invention also consists in the novel arrangement of parts and combinations of parts, as will be apparent by reference to the accompanying drawings, in which—

Figure 1 is a detail perspective view of a tank separated from a chassis and ready to be applied thereto.

Fig. 2 is a side elevational view of the tank wagon structure, parts being shown in section, and Fig. 3 is a front view, the front ends of the side sills of the chassis frame being shown in section.

The invention is illustrated as consisting of a chassis frame provided with side sills consisting of channels 1 and 2, connected at the rear by end channels 3 and at the front by any suitable means, preferably by a channel (not shown). The tank 4 is shown as provided with end plates 5 and 6 and partition plates 7 and 8, the end plates and partition plates having depending portions constituting bolsters 9, 10, 11 and 12.

The rear bolster 10 is provided with a bottom flange 13 in lateral alinement with the bottom flange 14 of an angle 15, which may be secured to the bolster 10 by bolts or other suitable means. The bottom flange 14 is provided with pluralities of openings 16 and 17 near the respective ends whereby it can be fastened by bolts or other suitable means to a cross beam 18, resting upon the channel side beams 1 and 2. The rear bolster 10 is rigidly fastened to the rear end of the chassis frame to afford stability for the structure. The front end, however, is shown as yieldingly connected, that is, there is a pivotal connection between the tank and the chassis frame.

The front bolster web is reinforced by a metal bar 19, which may be appropriately secured to the web by welding or any other means.

The tank is provided with means for dispensing the liquid from the various compartments between the end sheets and the partition sheets, there being three compartments shown in the illustration and at the respective compartments are funnel-shaped discharge orifices 20, 21 and 22. The discharge orifices 20 and 21 communicate with oppositely located side struts or tubular discharge conduits 23 and 24, which extend from end to end of the tank and pass through the respective bolsters to which they may be secured, if desired, by welding so that the pipes 23 and 24 not only serve as conduits for the fluid to be discharged from the compartments but they also constitute braces to make the tank structure *per se* more rigid than would be true if they were eliminated.

These conduits extend to the ends through the bolsters 10 and have appropriate nozzles or dispensing valves connected to them in the usual manner. The front ends of the pipes 23 and 24 extend through the bolster 9 and project beyond the front of the tank, the terminals of the pipes 23 and 24 being preferably closed by caps 25 and 26.

The projecting ends of the pipes 23 and 24 support a bearing bar 27, as clearly shown in Fig. 1. The bearing bar is provided with a central bearing opening 28, which alines with a corresponding opening 29 in the plate 19 and bolster 9, the openings 28 and 29 being for the purpose of receiving a pivot pin or journal 30, preferably provided with end openings 31 and 32 to receive cotter pins 33, whereby the journal or pivot pin will be held in place when it passes through the openings 28 and 29 and through an alining opening 34 in the saddle or supporting bar. The saddle or supporting bar is a built-up structure shown as comprising outer angles 35 and 36 with an intermediate web plate 37, the flanges of the angles 35 and 36 being secured to the top flanges of the side sills 1 and 2.

The saddle or supporting bar is also provided with notches or recesses 38 and 39 to provide clearances for the pipes 23 and 24 when the front end of the tank rocks.

When the rear end of the tank, that is, when the flange 14 is fastened to the cross sill or bar 18 and the saddle or supporting bar 40 is interposed between the bar 27 and the bar 19 with the pivot pin or journal in the openings 28, 29 and 34, it will be apparent that a three-point support is provided for a tank so that there may be relative movement of the chassis or wagon body independent of the tank and that the tubular members, shown as pipes 23 and 24, serve a three-fold purpose; that is, they constitute conduits through which the liquid may be drawn from the tank, they provide braces for the general tank structure and they also serve as supports for the bearing plate for the pivot or journal, by means of which the tank is pivotally supported to the chassis or wagon frame.

The construction herein described and its equivalent arrangement of parts makes it possible to provide a wagon tank structure of unusual strength at a minimum cost.

What I claim and desire to secure by Letters-Patent is:

1. A wagon tank, bolsters supporting it, bracing and dispensing pipes connecting the bolsters, means for communicating the pipes with the tank so that the pipes serve as braces for the bolsters and also as dispensing conduits, the ends of the pipes projecting beyond the tank, a journal bearing-member support connecting the ends of the pipes at one end of the tank, a flexible frame beneath the bolsters, a stabilizing connection between one end of the tank and one end of the flexible frame, a supporting bar on the frame having an opening alining with openings in the journal bearing member and in an end bolster, and a pivot journal passing through the openings to pivotally support the tank to the frame at the other end.

2. A wagon tank, bolsters supporting it, bracing and dispensing pipes connecting the bolsters, means for communicating the pipes with the tank so that the pipes serve as braces for the bolsters and also as dispensing conduits, the ends of the pipes projecting beyond the tank, a journal bearing-member support connecting the ends of the pipes at one end of the tank, a flexible frame beneath the bolsters, a stabilizing connection between one end of the tank and one end of the flexible frame, a supporting bar on the frame having on opening alining with openings in the journal bearing member and in an end bolster, and a pivot journal passing through the openings to pivotally support the tank to the frame at the other end, said supporting bar having pipe clearance notches in its upper edge.

3. In combination with a flexible frame, a tank body having a stabilizing support at one end of the frame, bracing pipes beneath the body and extending beyond the end thereof, said pipes communicating with the tank body, a journal bearing member carried by the projecting ends of the pipes, a cross bar at the end of the frame opposite to the stabilizing support, and a pivot passing through the bar and through the journal bearing member.

4. In combination with a flexible frame, a tank body having stabilizing supports at one end of the frame, a cross bar at the other end of the frame having an opening in the center thereof, dispensing pipes connected to the tank body and projecting beyond the end thereof, a pivot support spaced from the tank body and carried by the projecting ends of the pipes, the supporting bar being receivable between them, and a pivot passing through the journal bearing member and the openings in the cross bar.

5. In combination with a flexible frame, a tank body having stabilizing supports at one end of the frame, a cross bar at the other end of the frame having an opening in the center thereof, dispensing pipes connected to the tank body and projecting beyond the end thereof, a pivot support spaced from the tank body and carried by the projecting ends of the pipes, the supporting bar being receivable between them, and a pivot passing through the journal bearing member and the openings in the cross bar, one end of the pivot being supported by the tank body.

6. In combination with a frame comprising side sills and cross sills, a tank body, a bolster connected to one of the cross sills at one end of the frame, a bolster at the other end of the body above the frame, dispensing pipes communicating with the tank body and having ends projecting through the bolster supported above the frame, a bearing bar supported by the ends and spaced from the bolster, the cross bar at one end of the frame being disposed between the last named bolster and the journal bearing bar, and a pivot passing through the bolster supported above the frame, through the cross bar and through the journal bearing bar.

7. A wagon tank comprising a flexible frame having side sills and end sills, a tank body having bolsters at its respective ends, one bolster being rigidly connected to the flexible frame, dispensing pipes on the longitudinal sides of the tank body and projecting through the second bolster, a bearing bar connected to the ends of the pipes, a cross bar interposed between the bearing bar and the second bolster, and a pivot connection between the cross bar and the second mentioned bolster and the bearing bar.

In testimony whereof I affix my signature.

ANDREW A. KRAMER.